United States Patent [19]
Gonzalez et al.

[11] Patent Number: 5,279,042
[45] Date of Patent: Jan. 18, 1994

[54] SIGNAL TRANSMISSION SYSTEM FOR TRIGGER PROBE

[75] Inventors: Louis P. Gonzalez, Dammartin en Goële; Christian G. J. Courtois, Hameua de Mocquesouris both of France

[73] Assignee: Renishaw Metrology Limited, Gloucestershire, England

[21] Appl. No.: 857,279

[22] Filed: Mar. 25, 1992

[30] Foreign Application Priority Data

Mar. 29, 1991 [FR] France ............... 91 04141

[51] Int. Cl.$^5$ ............... G01B 21/04; H04B 7/00
[52] U.S. Cl. ............... 33/561; 33/558; 455/66; 340/870.16
[58] Field of Search ............... 33/556, 558, 559, 561, 33/503; 455/42, 67.1, 260, 66; 340/870.16, 870.3, 870, 28

[56] References Cited

U.S. PATENT DOCUMENTS

| | | |
|---|---|---|
| 4,118,871 | 10/1978 | Kirkham . |
| 4,130,941 | 12/1978 | Amsbury . |
| 4,153,998 | 5/1979 | McMurtry . |
| 4,658,509 | 4/1987 | Juengel ............... 33/558 |
| 4,864,294 | 9/1989 | Fakuhisa ............... 340/686 |
| 5,056,235 | 10/1991 | Thomas ............... 33/503 |
| 5,065,035 | 11/1991 | Juengel ............... 33/561 |

FOREIGN PATENT DOCUMENTS

| | | |
|---|---|---|
| 0002023 | 6/1982 | . |
| 0216032 | 4/1987 | European Pat. Off. . |
| 0268689 | 6/1988 | European Pat. Off. . |
| 0337671 | 10/1989 | European Pat. Off. . |
| 55-61163 | 5/1980 | Japan . |
| 1487 | 9/1977 | United Kingdom . |
| 2202715 | 9/1988 | United Kingdom . |

OTHER PUBLICATIONS

"Pilot-Tone System For Mobile Communication"; NTIS Tech Notes; 1987, Springfield, Va., USA; p.26.

Primary Examiner—William A. Cuchlinski, Jr.
Assistant Examiner—Alvin Wirthlin
Attorney, Agent, or Firm—Oliff & Berridge

[57] ABSTRACT

A radio transmission system for a touch trigger probe for machine tools or coordinate measuring machines. In the transmitter shown in FIG. 1, a 1 kHz oscillator produces a signal which is phase modulated by an electronic switch and an inverter, when electrical contacts within the probe change state. This phase modulated signal is mixed in a mixer with an unmodulated 500 Hz reference signal, produced in a divider from the oscillator, so that there is a precise phase relationship between the two signals. The receiver shown in FIG. 2 has filters which separate out the 500 Hz reference signal and the phase modulated 1 kHz signal. A decoder phase demodulates the 1 kHz signal, using the 500 Hz signal as a reference in order to increase the reliability of the resulting signal.

12 Claims, 4 Drawing Sheets

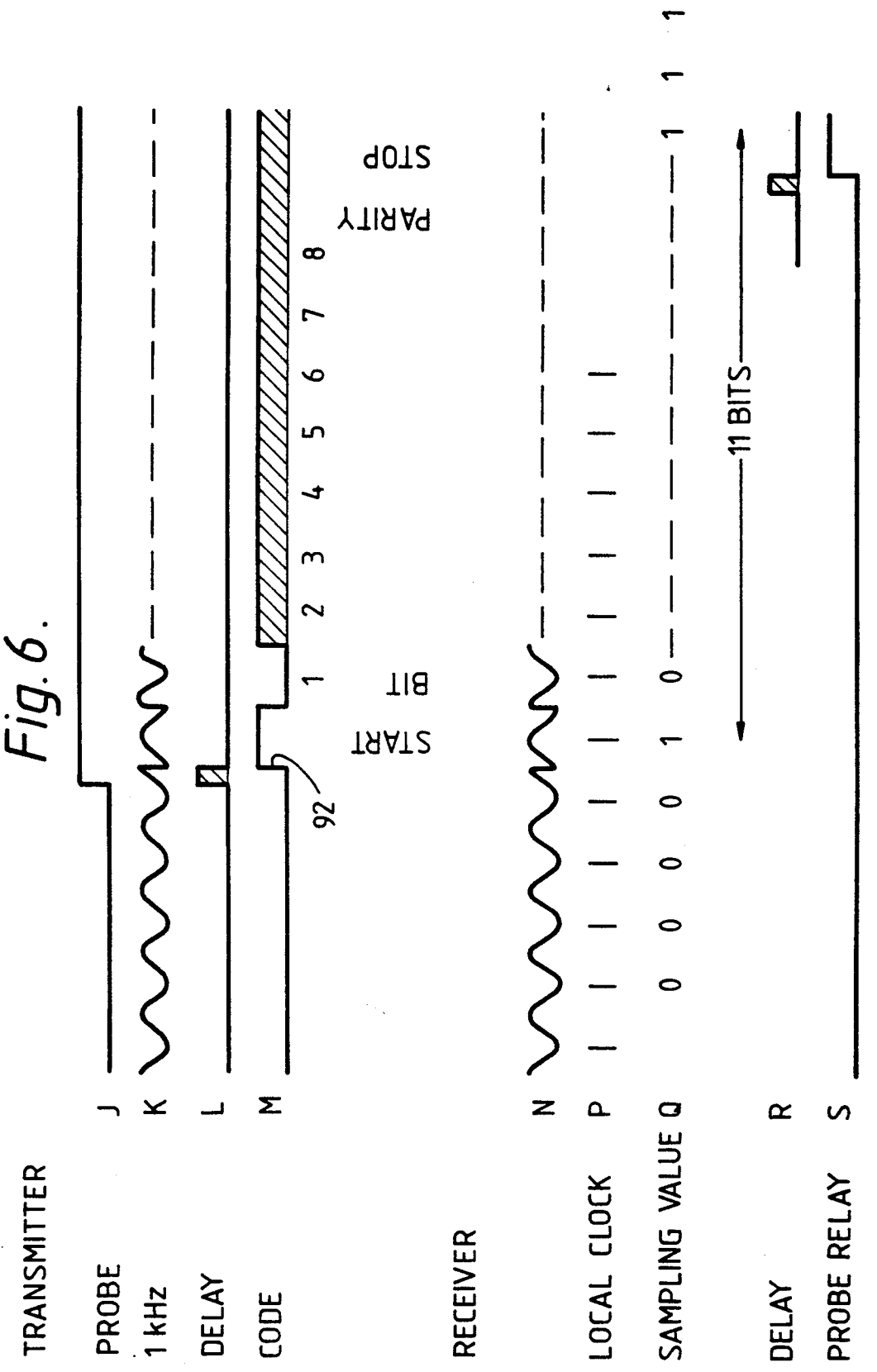

SIGNAL TRANSMISSION SYSTEM FOR TRIGGER PROBE

FIELD OF THE INVENTION

This invention relates to probes for use on machines which determine a position of a workpiece, such as coordinate measuring machines and machine tools. More particularly, it relates to signal transmission systems for such probes.

DESCRIPTION OF PRIOR ART

A trigger probe for such purposes is described in U.S. Pat. No. 4,153,998 (McMurtry). In use, the probe is moved by the machine relative to a workpiece. The probe has a deflectable stylus, and delivers a trigger signal when the stylus contacts the workpiece. The trigger signal is indicated by the probe switching from one state to another. The trigger signal is used by the control of the machine to freeze the outputs of scales or other measuring means which indicate the position of the probe. The position of the point of contact on the workpiece surface can thus be determined.

Especially on machine tools, it can be difficult to wire the probe directly to the machine control, and so various wireless signal transmission systems have been developed in the prior art. These include inductive systems (where the signal is transmitted by electro-magnetic induction between two coils); optical systems (where an optical emitter such an infra-red diode is provided on the probe and produces an optical signal which is received by an appropriate receiver); and radio systems (having a radio transmitter in the probe and a radio receiver fixed at a convenient location on the machine). An example of an optical system is shown in European Patent Application EP 337,671 (Renishaw). An example of a radio system is shown in U.S. Pat. No. 4,118,871 (Kearney & Trecker). An important requirement of such probes is repeatability, i.e. that the same result should be achieved every time a given measurement is repeated. The mechanical position of the stylus in the probes described in U.S. Pat. No. 4,153,998 is extremely repeatable in space, and the instant of production of the trigger signal always has a definite, repeatable relationship with the instant of contact between the stylus and the workpiece. This means that accurate results can be obtained from the probe by a simple calibration procedure.

However, the accuracy would be destroyed if the signal transmission system were not repeatable, that is, if there were an unknown, variable delay in the signal transmission. If this occurs, then the probe will travel an unknown, variable distance after the instant of generation of the trigger signal before the machine control is able to freeze the outputs of the measuring means. There is then an error between the position of contact and the position indicated by the frozen outputs, and this error is an unknown, variable quantity which cannot be removed by calibration. Thus, in order to maintain the overall accuracy of the probe system, there is the problem of ensuring that any transmission delays introduced by the signal transmission system are repeatable, i.e. the same delay should be introduced every time the probe is triggered. The probe calibration procedure mentioned above will then also remove this repeatable delay caused by the transmission system.

In the case of radio transmission systems, a further problem is that the bandwidth of the signal must be kept to a minimum, so as to comply with official regulations and reduce the likelihood of causing interference. Unfortunately, the requirement for a small bandwidth can conflict with the requirement for repeatable signal transmission, because to transmit a fast signal at a desired instant of time requires a relatively high bandwidth.

One commercially available radio probe transmission system, for example used a frequency shift keying method. Modulated onto the radio frequency carrier is one of two possible audio signals, having two different frequencies representing the two possible states of the probe. The trigger signal is indicated by a change of the audio signal from one frequency to the other when the probe changes state. However, the receiver of this system has difficulty in detecting the trigger signal in a repeatable manner, since the minimum time required to recognise the change from one audio frequency to the other is one cycle of the audio frequency, and probably two cycles. It is impossible for the receiver to know at what time during the previous cycle the change of state in the probe occurred. The uncertainity in the detection of the trigger signal, therefore, is at least one quarter of a cycle of the audio signal, giving rise to a corresponding degree of nonrepeatability. If the audio frequency is increased to reduce this problem, the bandwidth would also be increased.

SUMMARY OF THE INVENTION

One aspect of the present invention provides a signal transmission system for a probe for a position determination machine, comprising a transmitter for mounting with the probe, and a receiver for mounting on the machine for receiving the signal transmitted by the transmitter, and including:

master reference means in the transmitter for producing a master reference signal having a reference frequency;

slave reference means in the receiver for producing a slave reference signal which is synchronised with respect to said reference frequency;

carrier signal generating means in the transmitter for producing a carrier signal which is synchronised with respect to said reference frequency;

means in the transmitter for modulating a probe signal onto said carrier signal;

means in the receiver for receiving said modulated carrier signal; and means in the receiver for demodulating said probe signal from said modulated carrier signal, synchronously with the slave reference signal.

Preferably the modulating means is a phase modulating means for modulating the probe signal onto the carrier signal.

In preferred embodiments of this aspect of the invention, because the signal transmission system has a separate reference signal for keeping synchronism between the transmitter and the receiver, it is possible to detect the switching between one state of the probe output and the other state thereof more quickly and reliably than in the above mentioned commercially available radio transmission system. Moreover, compared with the system of EP 337,671, it is possible to ensure that synchronism is not lost even if there should be external interference at the time of a switching event, and the receiver can thus determine the current state of the probe output even after such interference. Furthermore, such a system can be realised with a relatively low bandwidth, if desired for a radio transmission system.

A second aspect of the present invention provides a signal transmission system for a probe for a position determination machine, comprising a transmitter for mounting with the probe, and a receiver for mounting on the machine for receiving the signal transmitted by the transmitter, and including:

carrier signal generating means in the transmitter for producing a carrier signal for transmission to the receiver;

means in the transmitter for modulating a probe signal onto the carrier signal;

timer means in the transmitter for determining the time of occurrence of a probe signal;

means for transmitting data representing the time determined by the timer means; and means in the receiver for receiving said data representing the time and producing a probing output signal derived therefrom.

At least in one preferred embodiment of the invention, this enables the modulation of the carrier to change state at a defined transition point in the carrier cycle, while still passing time information as to whereabouts within the carrier cycle the probing signal occurred. It is possible to transmit the time information without greatly increasing the bandwidth of the signal.

BRIEF DESCRIPTION OF THE DRAWINGS

Preferred embodiments of the present invention will now be described by way of example, with reference to the accompanying drawings, wherein:

FIG. 6 is a timing diagram showing the signals at various points in the circuits of FIGS. 4 and 5.

DESCRIPTION OF PREFERRED EMBODIMENTS

Figure 1:
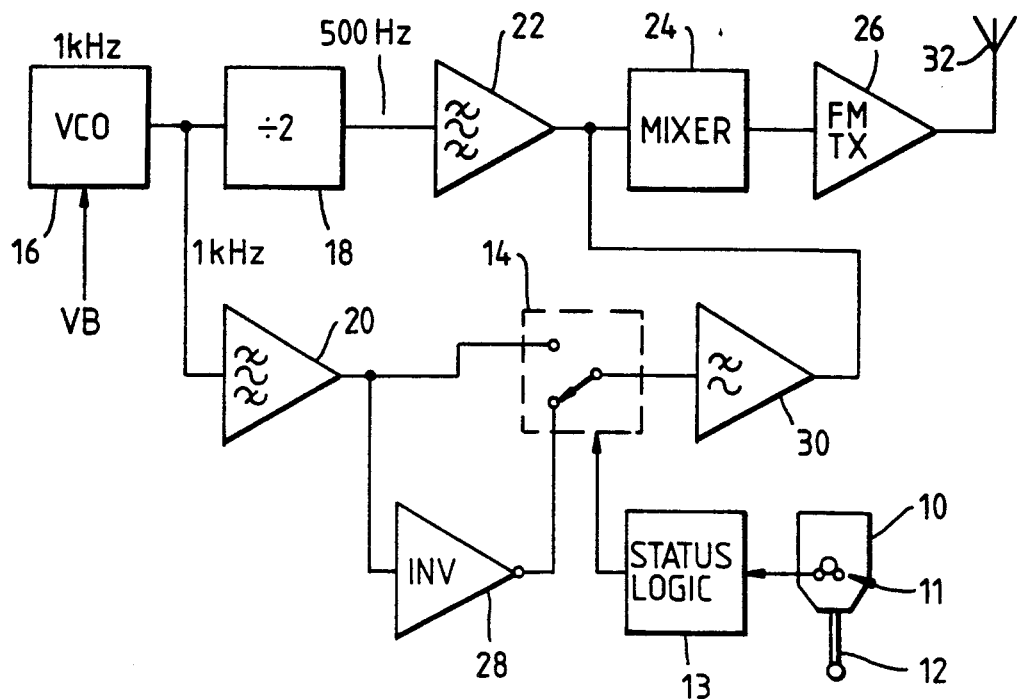
FIG. 1 is a block circuit diagram of a transmitter in a first signal transmission system according to the invention.

Referring to FIG. 1, a touch trigger probe 10 constructed in accordance with U.S. Pat. No. 4,153,998 includes kinematically arranged seating elements forming electrical contacts 11. Although only one set of electrical contacts 11 is shown, it will be appreciated that there are three such sets, connected in series in a normally closed circuit, which is opened when a deflectable stylus 12 of the probe 10 contacts a workpiece. The opening and closing of these contacts is detected by a status logic circuit 13, which provides debouncing and controls an electronic switch 14.

A voltage controlled oscillator 16 produces a square wave output which is nominally 1 kHz. This is shown as waveform A in FIG. 3, and is used as a carrier signal. The precise frequency of the oscillator 16 depends upon the battery voltage VB of the probe 10, enabling information to be transmitted to the receiver of the signal transmission system about the condition of the battery. The frequency shift in the oscillator 16 may be, for example, 100 Hz for the full range of possible battery voltage which is to be monitored, e.g. 2 volts.

Figure 3:
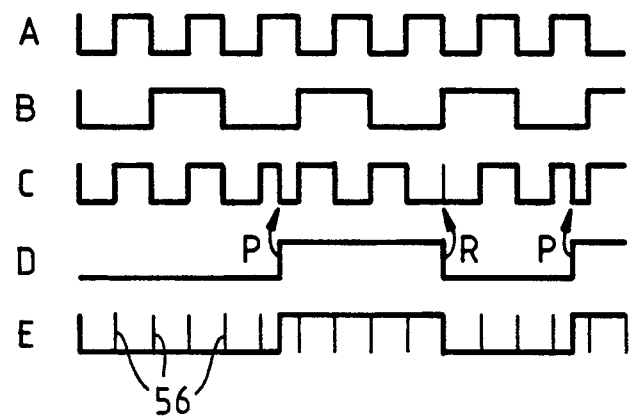
FIG. 3 is a timing diagram showing the signals at various points in the circuits of FIGS. 1 and 2.

The output of the oscillator 16 is fed to a divider 18, which divides it by 2, giving a 500 Hz output which has a definite phase relationship to the 1 kHz signal, shown as waveform B in FIG. 3. The 1 kHz carrier signal from the oscillator 16 and the 500 Hz signal from the divider 18 are each filtered by respective band pass filters 20,22, giving sinusoidal outputs which are mixed together in a mixer 24. The resulting signal is fed to a conventional FM transmitter circuit 26, where it is modulated onto a radio frequency carrier wave and transmitted as a radio signal from an aerial 32 in the probe 10. The narrow filters 20,22 limit the bandwidth of the radio signal, to comply with official regulations and to prevent the transmitter from interfering with other nearby equipment. The filters 20,22 are digital tracking filters, which have control inputs from the battery voltage VB to shift the sampling frequency. The centre frequencies of the pass bands of these filters therefore follow the drift of the oscillator 16 due to battery voltage change.

In order to encode the signal from the contacts 11 onto the signals described, the output of the 1 kHz filter 20 is fed to the mixer 24 either directly, or via an inverter 28, under the control of the electronic switch 14. Thus, when the probe contacts 11 are opened as a result of deflection of the stylus 12, the 1 kHz frequency is phase-shifted by 180°. A low pass filter 30 is provided at the output of the electronic switch 14, in order to limit the rise time of the data signal which results when the probe contacts 11 change state. Again, this is to limit the bandwidth of the transmitted signal.

Waveform C in FIG. 3 represents the resulting signal at the output of the electronic switch 14, assuming that the signal D is produced from the contacts 11. (Waveform C is shown in an idealised form, taking no account of the filters 20,30). It will be seen that there is a 180° change of phase at points P and R, corresponding to the instants at which the probe contacts 11 open and close respectively, when a workpiece is probed by the stylus 12 and when the stylus 12 subsequently reseats as it is moved out of contact with the workpiece.

Figure 2:
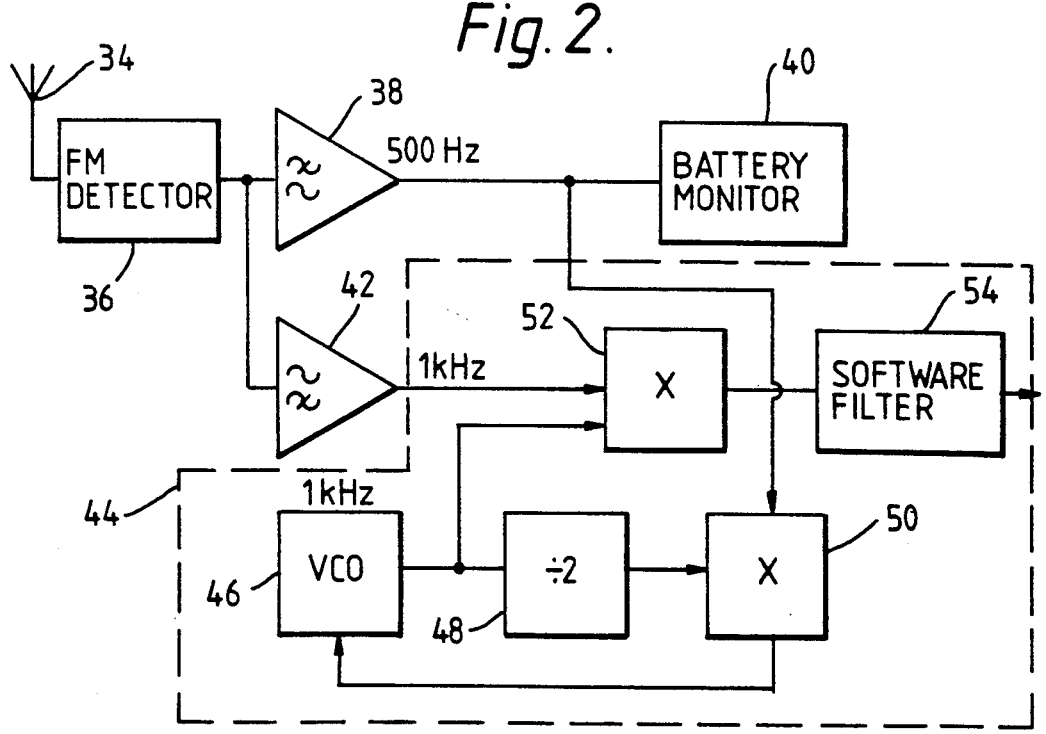
FIG. 2 is a block circuit diagram of a receiver for the first signal transmission system.

If desired, the filters 20,30 could be replaced by a single low pass filter, placed in the position of the filter 30. Such a filter would have a pass band determined by the necessary bandwidth for the data signal from the contacts 11. In practice, the signal from the contact 11 will be relatively fast. The use of a separate filter 20 for the 1 kHz signal, rather than such a combined filter, makes it easier to limit the spectrum of the transmitter. The signal transmitted from the aerial 32 in the transmitter is received by an aerial 34 of a receiver circuit shown in FIG. 2, which is mounted at a convenient fixed location on the machine to which the probe 10 is fitted. The radio signal is demodulated by an FM detector 36, which suitably may use the signal strength of the radio carrier frequency received to tune accurately the local oscillator within the FM detector 36 for best reception. The detector 36 thus delivers an audio signal containing the code shown in waveform C of FIG. 3.

At the output of the detector 36, a low pass filter 38 separates out the 500 Hz signal and sends it to a battery voltage monitor circuit 40. This circuit provides an output signal when the battery voltage is getting low, to warn the operator of the machine that the probe battery should be changed.

A high pass filter 42 separates out the 1 kHz signal from the audio output of the detector 36. The outputs of the two filters 38,42 are squared up, and taken to a decoder 44.

The decoder 44 includes a 1 kHz voltage controlled oscillator 46, the output of which is divided by 2 in a divider 48 and then compared with the 500 Hz signal from the filter 38 in a phase comparator 50. The result is fed back to the control input of the oscillator 46 thus forming a phase locked loop. The oscillator 46 thus recreates the original 1 kHz signal produced by the oscillator 16 in the transmitter, shown as waveform A in FIG. 3. This is compared with the output of the high pass filter 42 in a phase comparator 52. The resulting phase comparison signal contains the information from the probe contacts 11.

The output from the phase comparator 52 is shown as waveform E in FIG. 3. It can be seen that the base line of this signal is zero when the probe contacts are closed, and 1 when the probe contacts are open. There is a difficulty, however, in that there are small transitions or spikes 56 in the signal due to phase error and to phase detector error. To overcome this problem, the signal is analysed digitally in a software filter 54. At each of the spikes 56, a software timer is activated which has a fixed period slightly longer than the duration of the spike. At the end of the fixed period, the signal is analysed by the software to see if a change of state has occurred, corresponding to a change in the state of the probe contacts 11. If such a change of state has indeed occurred, the output signal of the software filter is activated, a fixed delay after the corresponding transition in the input to the filter. It will be appreciated that the delay thus introduced does not cause a problem, as long as it is repeatable, since it is calibrated out by the usual calibration procedure when the probe 10 is used.

In place of the software filter 54, equivalent digital hardware could be used, e.g. using a monostable instead of a software timer. Alternatively, instead of analysing digital signals it is possible to analyse sinusoidal signals at the outputs of the filters 38,42. The phase angle at which the change of state of the contacts 11 occurs can be deduced by comparing the relative amplitudes of the sinusoidal signals.

An important advantage of the transmitter and receiver systems described above is that the resulting output of the receiver indicates at all times the status of the contacts 11 (open or closed). This is possible because the 500 Hz signal provides a phase reference against which the relative phase of the 1 kHz signal can be judged. This means that information as to the current status of the probe contacts is always available, so that the machine control to which the receiver is connected is provided with reliable information as to whether the probe is ready for probing a workpiece, or is already in contact with the workpiece. Without such a phase reference, it would only be possible to detect changes in phase in the 1 kHz signal, which would be unreliable if interference occurred at the time of a change of state of the contacts 11.

The second embodiment will now be described, with reference to FIGS. 4 to 6.

Figure 4:
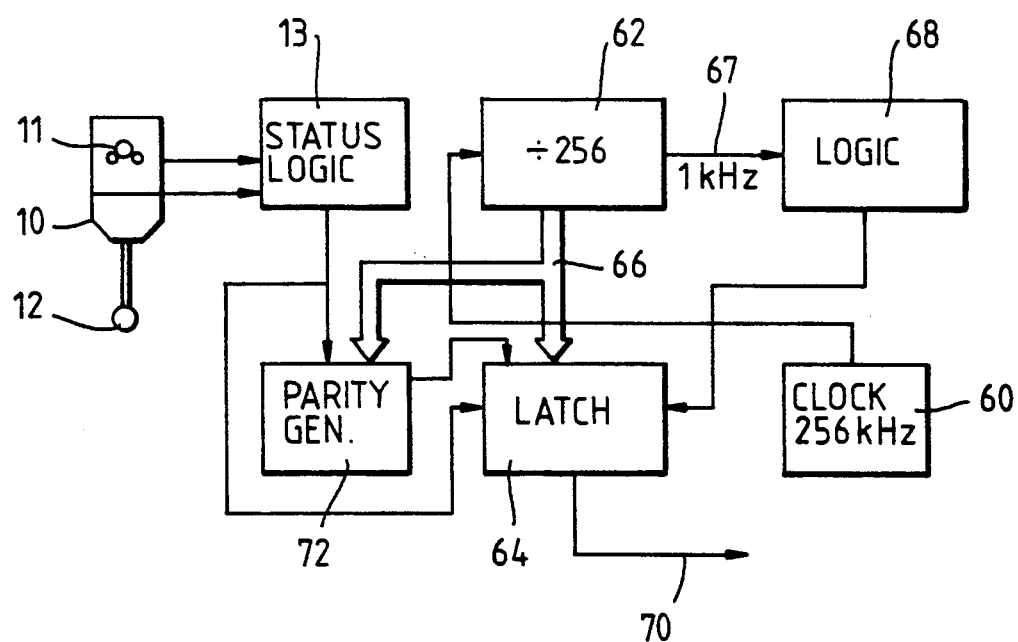
FIG. 4 is a block circuit diagram of a transmitter for a second signal transmission system according to the invention.

FIG. 4 shows transmitter circuits which are additional to those of FIG. 1. It also shows the probe 10 having contacts 11 and a status logic circuit 13 as before. A clock circuit 60 produces clock pulses at 256 kHz. This drives a divide-by-256 counter 62, giving a 1 kHz output 67 and a parallel binary counter output on a data bus 66. When the status logic 13 indicates that the probe contacts 11 have changed state, it provides a latch input to a shift register 64. The current value held in the counter 62 is then loaded into the shift register 64 from the data bus 66.

The 1 kHz output 67 of the counter 62 is taken to a logic circuit 68, which controls the shift register 64 such that when a value has been loaded into the shift register from the counter 62, it is then transmitted serially on an output line 70, as a burst of serially coded binary data. At the same time as the loading of the data value into the shift register 64, the same value is loaded into a parity generator circuit 72, which provides a parity bit which is added to the end of the data burst. Start and stop bits are also added to the data burst.

The data signal on the line 70 is used to control the electronic switch 14 of FIG. 1, in place of the direct connection shown in FIG. 1 between the status logic circuit 13 and the electronic switch 14. Thus, the serial data signal produces a phase modulation of the 1 kHz sine wave, which is combined with the 500 Hz reference signal and modulated onto the radio output signal. The 1 kHz output 67 of the counter 62 is used in place of the 1 kHz oscillator 16 in FIG. 1. Thus, the clock 60 provides the time standard for the entire system, and the counter output on the data bus 66 at any given time is a count of the elapsed time since the beginning of the 1 kHz cycle. In particular, the value latched into the shift register 64 indicates the time elapsed between the start of the 1 kHz cycle and the change of state of the probe contacts 11.

Figure 5:
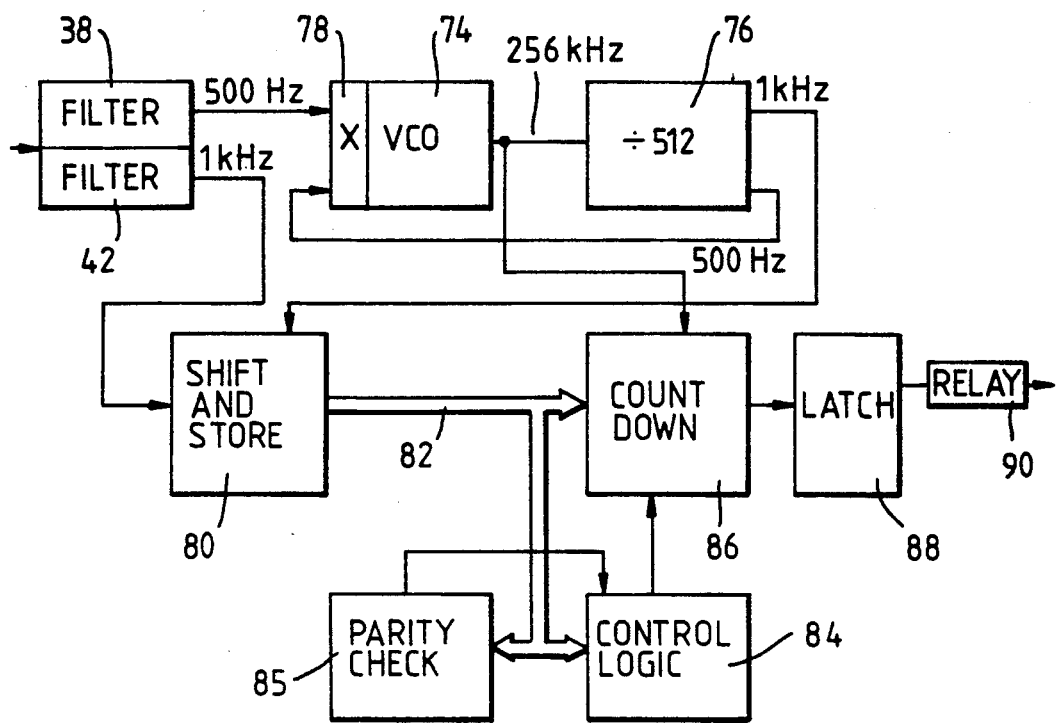
FIG. 5 is a block circuit diagram of a receiver for the second signal transmission system.

FIG. 5 shows a receiver circuit for use in decoding the signals produced by the transmitter of FIG. 4. As in FIG. 2, the receiver comprises an FM detector (not shown in FIG. 5) which demodulates the radio frequency signals received, and filters 38,42 which separate out the 500 Hz and 1 kHz signals respectively. A local voltage controlled oscillator 74 produces a 256 kHz output, which is divided by 512 in a divider 76 to give a 500 Hz output. The oscillator 74 has a phase comparator 78 at its input, which compares the 500 Hz output of the divider 76 with the 500 Hz reference signal from the filter 38, thus ensuring that the oscillator 74 is permanently synchronised with the clock 60 in the transmitter. The circuit is a phase locked loop, as previously.

The divider 76 also provides a 1 kHz output, which drives the clock input of a shift register 80. The shift register 80 receives the 1 kHz signal from the filter 42, onto which the serial data is phase modulated. As the shift register 80 is clocked at 1 kHz by the divider 76, this causes the serial data to be sampled. Corresponding data bits are shifted into the shift register and stored, depending on the phase of the 1 kHz output from the filter 42 at the instant of each 1 kHz clock input pulse.

The shift register 80 produces a parallel output on a data bus 82. During steady state operation, all the lines in this bus will be at logic level zero, indicating that the probe contacts 11 have been closed for a period of time; or they will all be at logic level 1, indicating that the probe contacts have been open for a period of time. A control logic circuit 84 monitors the data bus 82, and is activated by the entry into the shift register 80 of the start of a binary burst of data which occurs when the probe contacts 11 change state. When the control logic 84 detects the end of the data burst, a circuit 85 checks the parity bit of the data, and the current contents of the shift register 80 are then loaded into a counter 86. Thus, the value now present in the counter 86 is equal to the time value coded in the transmitter. The counter 86 receives clock pulses at 256 kHz from the oscillator 74, in phase with the clock pulses in the transmitter, and now counts downwards at this rate until the value held in the counter reaches zero. When this happens, a latch 88 changes state, and this latch controls a solid state relay 90 which generates the output signal to the machine control which indicates that the probe contacts 11 have changed state.

It will be appreciated that the length of time taken for the counter 86 to count down to zero is equal to the length of time latched into the shift register 64 in the transmitter, which indicates the time period between the start of a 1 kHz cycle of the system and the change of state of the probe contacts 11. We have found that despite the low bandwidth of the system, nevertheless the circuits described above make it possible for the 256 kHz oscillator 74 to be very precisely synchronised with the 256 kHz clock 60 in the transmitter, and for the 1 kHz output of the divider 76 in the receiver to be in a very precise phase relationship with the 1 kHz signal 67. As a result, although the delay between the probe contact status change and the corresponding output signal from the relay 90 is relatively long, about 11 milliseconds, nevertheless the delay involved is very precisely repeatable (i.e. it is precisely the same every time the probe contacts 11 change state), to within a few microseconds. Thus, a high degree of repeatability of the signal is achieved despite the low bandwidth.

FIG. 6 represents the signals at various points in the transmitter and receiver of FIGS. 4 and 5. In this Figure, waveform J indicates the status of the probe contacts 11 (after the debounce provided by the status logic circuit 13). Waveform K shows the phase modulated 1 kHz signal (before the filter 30 of FIG. 1). At L, there is indicated the short delay between the transition of the probe contacts as shown in J, and the phase inversion in the waveform K. It is this delay which is encoded in the shift register 64 of the transmitter.

Waveform M represents the serially coded data burst on the line 70, which commences with a start bit 92, followed by an eight bit serial data word, a parity bit and a stop bit, generated in the shift register 64 with the aid of the parity generator 72.

In the receiver, waveform N of FIG. 6 shows the received 1 kHz phase modulated signal, which is the same as waveform K in the transmitter. Waveform P shows clock pulses at 1 kHz derived from the counter 76 and line Q shows the sampled values which are shifted into the shift register 80 as a result. In line R, there is a representation of the delay value which is latched into the counter 86 in the receiver, which corresponds to the transmitter delay value shown in line L. When the counter 86 produces an output at the end of this delay, the relay 90 produces an output signal shown as waveform S.

Figure 7:
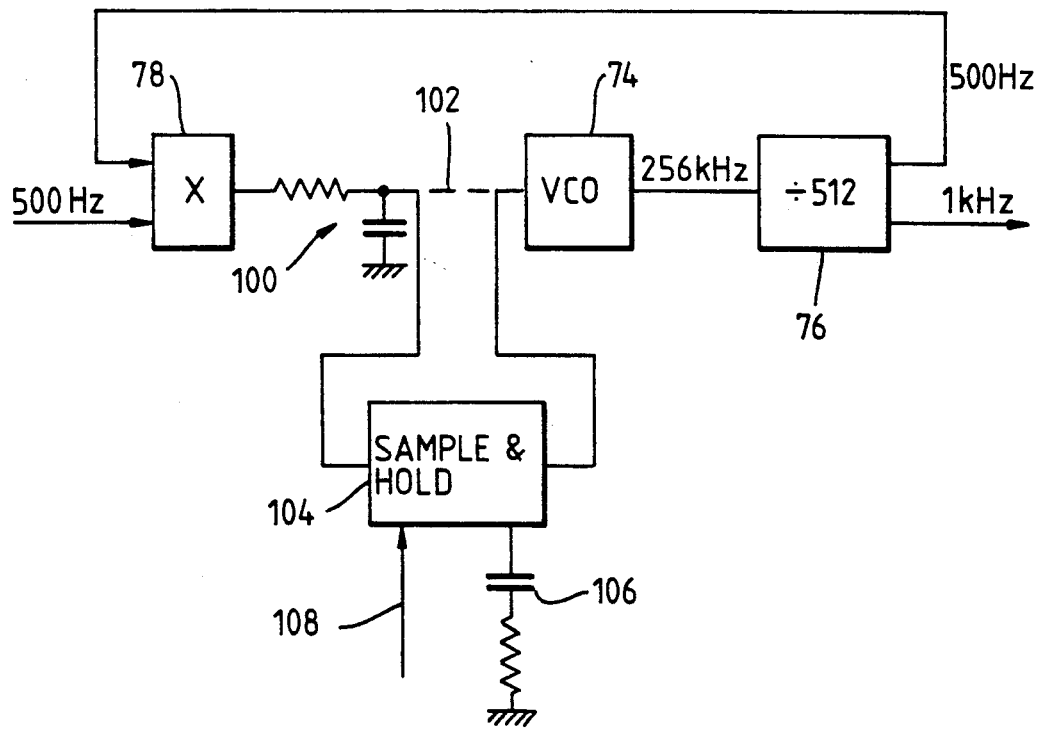
FIG. 7 is a circuit diagram of a modification of the receiver of FIG. 5.

FIG. 7 shows an improvement to the decoder circuitry in the receiver of FIG. 5. It shows in more detail the phase locked loop around the oscillator 74 of the receiver. It would be normal for such a phase locked loop to include a low pass filter 100 between the output of the phase comparator 78 and the input of the voltage control oscillator 74, connected as shown by a dotted line 102 in FIG. 7. This filter controls the time constant of the phase locked loop, stabilising the loop by removing small changes in the output of the phase comparator caused by minor variations in the phase error.

Necessarily there are a number of amplifiers and filters in the FM radio transmission and receiving circuits, and also the filters 20,22,30,38 and 42. Because these amplifiers and filters cannot be perfect, during the transmission process there is inevitably a slight phase change that causes an uncertainty (a lack of repeatability) in the final signal. To reduce these uncertainties, it would be desirable to increase the time constants of the filter 100. Unfortunately, to do so would increase the instability of the phase locked loop decreasing its ability to track variations in the transmitter clock. A simple increase in the time constant is therefore not practicable.

In the present modification, therefore, the normal connection 102 is replaced by a sample and hold circuit 104. In the normal operation of the circuit, when there is no change in status of the probe contacts 11, the sample and hold circuit 104 feeds the output of the filter 100 straight through to the input of the voltage controlled oscillator 74, so that the phase locked loop works in the normal way. The phase errors introduced by the amplifiers and filters can be tolerated in this condition. Nevertheless, throughout this condition, the sample and hold circuit 104 is integrating the output of the filter 100, and causing an average value for the oscillator input to be stored on a capacitor 106, with a long time constant compared to the filter 100. When the control logic 84 (FIG. 5) detects the beginning of a data burst, it provides an input to the sample and hold circuit 104 on a line 108. This causes the sample and hold circuit to cease feeding through the output of the filter 100, and instead to sample the integrated average value held on the capacitor 106. This stable value is held constant throughout the data burst and throughout the decoding sequence. Thus, during the decoding the frequency of the oscillator is held very stable, removing phase errors caused in the amplifiers and filters, and giving a high repeatability. Nevertheless, as soon as the decoding sequence has finished, the relatively low time constant of the filter 100 continues to govern the phase locked loop, so that the loop can react to any changes in frequency and so that there is no risk of the phase locked loop ceasing to track the frequency of the oscillator in the transmitter.

We claim:

1. A signal transmission system for a probe for a position determination machine, wherein said probe provides a probe signal, the system comprising a transmitter for mounting with the probe, and a receiver for mounting on the machine for receiving the probe signal transmitted by the transmitter, and including:

means in the transmitter for producing a first reference signal having a reference frequency;

means in the receiver for producing a second reference signal which is synchronised with respect to said reference frequency;

carrier signal generating means in the transmitter for producing a carrier signal which is synchronised with respect to said reference frequency;

means in the transmitter for modulating the probe signal onto said carrier signal;

means in the receiver for receiving said modulated carrier signal; and means in the receiver for demodulating said probe signal from said modulated carrier signal, synchronously with the second reference signal.

2. A signal transmission system according to claim 1, wherein the modulating means is a phase modulating means for modulating the probe signal onto the carrier signal.

3. A signal transmission system according to claim 1, including:
- timer means in the transmitter for determining a time of occurrence of said probe signal;
- means for transmitting data representing the time determined by the timer means; and
- means in the receiver for receiving said data representing the time and producing a probing output signal derived therefrom.

4. A signal transmission system according to claim 3, including:
- carrier receiving means in the receiver, for receiving the transmitted carrier signal in a synchronised relationship therewith, such that a point in a cycle of the carrier signal in the receiver corresponds to a point in the cycle of the carrier signal in the transmitter;
- wherein said timer means comprises means for measuring a time delay between an instant of the probe signal and an instant of said point in the carrier cycle in the transmitter;
- and wherein said means in the receiver for receiving said data representing time derives said probing output signal from the measured time delay and said point in the receiver carrier cycle.

5. A signal transmission system according to claim 3, wherein the means for transmitting the data representing the time encodes said time as serial data.

6. A signal transmission system according to claim 1, wherein the means for producing said second reference signal comprises a phase locked loop.

7. A signal transmission system according to claim 6, including a low pass filter having a given time constant in the phase locked loop; and means for increasing said given time constant upon receipt of said probe signal.

8. A signal transmission system according to claim 1, wherein said transmitter is a radio transmitter and said receiver is a radio receiver.

9. A signal transmission system for a probe for a position determination machine, wherein said probe provides a probe signal, the system comprising a transmitter for mounting with the probe, and a receiver for mounting on the machine for receiving the signal transmitted by the transmitter, and including:
- carrier signal generating means in the transmitter for producing a carrier signal for transmission to the receiver;
- means in the transmitter for modulating said probe signal onto the carrier signal;
- timer means in the transmitter for determining a time of occurrence of said probe signal;
- means for transmitting data representing the time determined by the timer means; and
- means in the receiver for receiving said data representing the time and producing a probing output signal derived therefrom.

10. A signal transmission system according to claim 9, including:
- carrier receiving means in the receiver, for receiving the transmitted carrier signal in a synchronised relationship therewith, such that a point in a cycle of the carrier signal in the receiver corresponds to a point in the cycle of the carrier signal in the transmitter;
- wherein said timer means comprises means for measuring a time delay between an instant of said probe signal and an instant of said point in the carrier cycle in the transmitter;
- and wherein said means in the receiver for receiving said data representing the time derives said probing output signal from the measured time delay and said point in the receiver carrier cycle.

11. A signal transmission system according to claim 9, wherein the means for transmitting the data representing the time encodes said time as serial data.

12. A signal transmission system according to claim 9, wherein said transmitter is a radio transmitter and said receiver is a radio receiver.

* * * * *